United States Patent Office.

DAVID STEWART, OF KITTANNING, ASSIGNOR TO HIMSELF AND SAMUEL M. KIER, OF PITTSBURG, PENNSYLVANIA.

Letters Patent No. 99,367, dated February 1, 1870.

IMPROVEMENT IN THE MANUFACTURE OF IRON.

The Schedule referred to in these Letters Patent and making part of the same.

*To all whom it may concern:*

Be it known that I, DAVID STEWART, of Kittanning, in the county of Armstrong, and State of Pennsylvania, have invented a new and useful Improvement in the Manufacture of Iron and Steel; and I do hereby declare that the following is a full, clear, and exact description thereof.

The nature of my invention consists in the manufacture of "refined blooms or ingots," suitable for purposes of the manufacture of iron and steel, by mixing, with melted cast-iron, granulated cast-iron which has been partially converted into wrought-iron, and to which has been added a suitable fluxing and cinder-forming material.

To enable others skilled in the art of manufacturing iron and steel to use my invention, I will proceed to describe more fully my process for the manufacture of refined blooms or ingots.

I take molten cast-iron direct from the blast-furnace, or remelted pig-iron, and granulate and partially convert it into wrought-iron, by causing it to run in a stream, from a height of about forty feet, down through a column of air, and fall into a suitable reservoir or vessel of water, or into a dry chamber; or the molten cast-iron may be granulated, and partially converted into wrought-iron, by the process described in Letters Patent granted to me on the 17th of December, 1867, and numbered 72,335.

To about thirty-five pounds of the above granulated iron are added about fifteen pounds of sand, lime, or pulverized limestone, or other suitable fluxing and cinder-forming material, thoroughly mixing the granulated iron and fluxing and cinder-forming material together, and then mix this mixed mass with about one hundred pounds of molten cast-iron, in the following manner:

I take a suitable mould for giving the desired form to the blooms or ingots, and for making them of the size and weight required. The mould may be made in two or more parts, and held together by a band or other device. I then place in the bottom of the mould, so as to cover over the bottom, a small quantity of the mixture of granulated iron and fluxing-material. The molten cast-iron, and the mixture of granulated iron and fluxing-material and the molten cast-iron, are then poured into the mould, (a simultaneous stream of each,) taking care to mix the molten cast-iron and the mixture of granulated iron and fluxing-material well together, by stirring the whole with a bar of iron, or with other means.

After the mixed mass has become sufficiently congealed, the mould may be separated, and the bloom or ingot removed; and, after becoming cooled by exposure to the action of the atmosphere, it is then reheated, and worked in any known manner for working it into other forms of merchantable iron and steel.

I have given, in the foregoing, a description for making a single bloom. For working on a larger scale, the same relative quantities of the molten cast-iron, granulated iron, and fluxing and cinder-forming material must be used for each bloom or ingot made.

The arrangement of a series of moulds, and the manipulating of them, and the means used for mixing together in the mould the constituent parts which compose the bloom or ingot, I leave to the skill and judgment of the mechanic and manufacturer.

Having thus described my process for manufacturing blooms or ingots,

What I claim as of my invention, is—

Mixing granulated iron and a fluxing and cinder-forming material with molten cast-iron, substantially as herein described, for making blooms or ingots, suitable for the purposes of manufacturing iron and steel.

DAVID STEWART.

Witnesses:
GEO. H. THOMAS,
JAMES J. JOHNSTON.